United States Patent
Zhu et al.

(10) Patent No.: US 12,336,069 B2
(45) Date of Patent: Jun. 17, 2025

(54) CONSTANT-CURRENT SWITCH-MODE POWER CONVERTERS FOR LED LIGHTING AND METHODS THEREOF

(71) Applicant: ON-BRIGHT ELECTRONICS (SHANGHAI) CO., LTD., Shanghai (CN)

(72) Inventors: Liqiang Zhu, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 84 days.

(21) Appl. No.: 18/222,417

(22) Filed: Jul. 14, 2023

(65) Prior Publication Data

US 2025/0024571 A1   Jan. 16, 2025

(30) Foreign Application Priority Data

May 19, 2022   (CN) .......................... 202210545406.2

(51) Int. Cl.
*H05B 45/3725* (2020.01)

(52) U.S. Cl.
CPC ............................... *H05B 45/3725* (2020.01)

(58) Field of Classification Search
CPC ................ H05B 45/37–392; H05B 45/32–355
See application file for complete search history.

(56) References Cited

U.S. PATENT DOCUMENTS

| | | | |
|---|---|---|---|
| 11,582,843 B1 * | 2/2023 | Gritti | H05B 45/325 |
| 2016/0294282 A1 * | 10/2016 | Herfurth | H05B 45/375 |

FOREIGN PATENT DOCUMENTS

| | | | | |
|---|---|---|---|---|
| CN | 104429159 A | * | 3/2015 | ............. F21K 9/135 |
| CN | 105703640 A | * | 6/2016 | ............. H02M 1/08 |
| CN | 112654108 A | | 4/2021 | |
| KR | 20150126817 A | * | 11/2015 | ............. H05B 45/46 |
| TW | 202123589 A | | 6/2021 | |

OTHER PUBLICATIONS

Taiwan Intellectual Property Office, Office Action mailed Jul. 4, 2023, for Application No. 111132128.

* cited by examiner

*Primary Examiner* — Abdullah A Riyami
*Assistant Examiner* — Syed M Kaiser
(74) *Attorney, Agent, or Firm* — Faegre Drinker Biddle & Reath LLP

(57) ABSTRACT

Controller and method for a constant-current switch-mode power converter. For example, a controller for a constant-current switch-mode power converter includes: a constant-current controller configured to receive an input voltage and generate a modulation signal based at least in part on the input voltage; and a driver configured to receive the modulation signal, generate a drive signal based at least in part on the modulation signal, and output the drive signal to a transistor coupled to an inductive coil and a resistor; wherein: the drive signal corresponds to at least one switching cycle; the switching cycle includes an on-time during which the drive signal is at a first logic level and an off-time during which the drive signal is at a second logic level; and the off-time includes a demagnetization period during which the inductive coil undergoes a demagnetization process.

23 Claims, 6 Drawing Sheets

CONSTANT-CURRENT SWITCH-MODE POWER CONVERTERS FOR LED LIGHTING AND METHODS THEREOF

1. CROSS-REFERENCES TO RELATED APPLICATIONS

This application claims priority to Chinese Patent Application No. 202210545406.2, filed May 19, 2022, incorporated by reference herein for all purposes.

2. BACKGROUND OF THE INVENTION

Certain embodiments of the present invention are directed to circuits. More particularly, some embodiments of the invention provide constant-current switch-mode power converters and methods thereof. Merely by way of example, some embodiments of the invention have been applied to LED lighting. But it would be recognized that the invention has a much broader range of applicability.

The power converters can convert electric power from one form to another form. As an example, the electric power is transformed from alternate current (AC) to direct current (DC), from DC to AC, from AC to AC, or from DC to DC. Additionally, the power converters can convert the electric power from one voltage level to another voltage level. The power converters include linear converters and switch-mode converters. The switch-mode converters often are implemented with various architectures, such as the fly-back architecture, the buck architecture, and/or the boost architecture. Switch-mode power converters are often used as power supply devices for light-emitting diodes (LEDs).

In recent years, light-emitting diodes (LEDs) are often used because of their long life, low cost, and/or small size compared to incandescent light source, halogen light source, and/or fluorescent light source. Usually, the brightness of a light-emitting diode (LED) is mainly controlled by the current flowing through the LED, so high-precision constant-current control is important to designing a switch-mode power converter that is used as a constant-current power supply for LED lighting.

FIG. 1 is a simplified diagram showing a conventional constant-current switch-mode power converter for LED lighting with dimming control. The constant-current switch-mode power converter 100 includes a bridge rectifier 110, capacitors 112 and 114, a diode 116, an inductive coil 118, a transistor 120, a resistor 122, and a converter controller 150. In some examples, the constant-current switch-mode power converter 100 is a buck power converter. In certain examples, the transistor 120 is a power transistor. For example, the converter controller 150 (e.g., a chip) includes terminals 130, 132, 134, 136 and 138 (e.g., pins). As an example, the converter controller 150 also includes a low-dropout regulator (LDO) 140, a dimming controller 142, a demagnetization detector 144, a constant current controller 146, and a driver 148.

As shown in FIG. 1, the constant-current switch-mode power converter 100 receives an AC voltage 190 and generates an output current 192 based at least in part on a dimming control signal 135. The output current 192 is received by one or more LEDs 180 and is used to control brightness of the one or more LEDs 180 according to the dimming control signal 135. The brightness of the one or more LEDs 180 can be adjusted by changing the dimming control signal 135. In more detail, the bridge rectifier 110 of the constant-current switch-mode power converter 100 receives the AC voltage 190 and generates a voltage 111 (e.g., VIN) based at least in part on the AC voltage 190. The converter controller 150 receives the voltage 111 (e.g., VIN) at the terminal 130, receives the dimming control signal 135 at the terminal 132, receives a ground voltage 133 at the terminal 134, receives a sensing voltage 137 at the terminal 136, and generates a drive signal 139 at the terminal 138. The drive signal 139 (e.g., a drive voltage) is received by the transistor 120 and is used to turn on and/or turn off the transistor 120. In some examples, the transistor 120 is coupled to the inductive coil 118 through at least the diode 116 and/or the capacitor 114, and the transistor 120 is also coupled to the resistor 122. For example, the sensing voltage 137 is generated by a current 123 that flows through the resistor 122. As an example, the sensing voltage 137 represents a current 119 that flows through the inductive coil 118 if the transistor 120 is turned on.

The low-dropout regulator (LDO) 140 receives the voltage 111 (e.g., VIN) through the terminal 130 and generates a voltage 141 (e.g., VDD) based at least in part on the voltage 111. The voltage 141 (e.g., VDD) is used to supply power to one or more internal circuits of the converter controller 150. Additionally, the dimming controller 142 receives the dimming control signal 135 through the terminal 132 and a reference voltage 143 and generates a regulation voltage 147 (e.g., $V_{dim}$) based at least in part on the dimming control signal 135 and the reference voltage 143. For example, the demagnetization detector 144 receives the drive signal 139 and generates a demagnetization signal 145 (e.g., Dem) based at least in part on the drive signal 139. The demagnetization signal 145 (e.g., Dem) indicates the end of a demagnetization process of the inductive coil 118. Also, the constant current controller 146 receives the sensing voltage 137, the demagnetization signal 145 (e.g., Dem) and the regulation voltage 147 (e.g., $V_{dim}$), and generates a signal 149 (e.g., a pulse width modulation signal) based at least in part upon the sensing voltage 137, the demagnetization signal 145 (e.g., Dem) and the regulation voltage 147 (e.g., $V_{dim}$). For example, the regulation voltage 147 (e.g., $V_{dim}$) is used as an input voltage for the constant current controller 146. The signal 149 (e.g., a pulse width modulation signal) is received by the driver 148, which generates the drive signal 139 based at least in part upon the signal 149. If the signal 149 is at a logic high level, the drive signal 139 is also at the logic high level, and if the signal 149 is at a logic low level, the drive signal 139 is also at the logic low level.

In some examples, the drive signal 139 is a drive voltage, which is received by a gate terminal of the transistor 120. For example, the dimming control signal 135 is a DC signal (e.g., a DC voltage). As an example, the dimming control signal 135 is a pulse width modulation signal (e.g., a pulse width modulation voltage). The demagnetization signal 145 (e.g., Dem) is used for constant current control and operation mode control of the constant-current switch-mode power converter 100. For example, the constant-current switch-mode power converter 100 operates in the discontinuous conduction mode (DCM). As an example, the constant-current switch-mode power converter 100 operates in the quasi-resonant (QR) mode. The sensing voltage 137 is used to implement the closed-loop constant current control of the constant-current switch-mode power converter 100.

As an alternative to FIG. 1, for example, the demagnetization detector 144 receives an external signal from a source that is external to the converter controller 150 (e.g., a chip) and generates the demagnetization signal 145 (e.g., Dem) based at least in part on the external signal.

Hence it is highly desirable to improve the technique for switch-mode power converters used as constant-current power supplies.

3. BRIEF SUMMARY OF THE INVENTION

Certain embodiments of the present invention are directed to circuits. More particularly, some embodiments of the invention provide constant-current switch-mode power converters and methods thereof. Merely by way of example, some embodiments of the invention have been applied to LED lighting. But it would be recognized that the invention has a much broader range of applicability.

According to certain embodiments, a controller for a constant-current switch-mode power converter includes: a constant-current controller configured to receive an input voltage and generate a modulation signal based at least in part on the input voltage; and a driver configured to receive the modulation signal, generate a drive signal based at least in part on the modulation signal, and output the drive signal to a transistor coupled to an inductive coil and a resistor: wherein: the drive signal corresponds to at least one switching cycle: the switching cycle includes an on-time during which the drive signal is at a first logic level and an off-time during which the drive signal is at a second logic level; and the off-time includes a demagnetization period during which the inductive coil undergoes a demagnetization process: wherein: the constant-current controller includes a reference voltage generator configured to receive the input voltage and generate a reference voltage based at least in part on the input voltage; and the reference voltage is equal to the input voltage multiplied by a ratio of the on-time to a sum of the on-time and the demagnetization period.

According to some embodiments, a constant-current controller includes: a reference voltage generator configured to receive an input voltage and generate a reference voltage based at least in part on the input voltage: an error amplifier configured to receive the reference voltage and a sensing voltage from a resistor coupled to a transistor, the error amplifier being further configured to generate, together with a capacitor, a compensation voltage based at least in part on the reference voltage and the sensing voltage: a level shifter configured to receive the compensation voltage and generate a level-shifted voltage based at least in part on the compensation voltage: a comparator configured to receive the level-shifted voltage and the sensing voltage and generate the comparison signal based at least in part on the level-shifted voltage and the sensing voltage: a time controller configured to receive a demagnetization signal indicating an end of a demagnetization process of an inductive coil coupled to the transistor, the time controller being configured to generate a control signal based at least in part on the demagnetization signal; and a flip flop configured to receive the comparison signal and the control signal and generate a modulation signal based at least in part on the comparison signal and the control signal.

According to certain embodiments, a method for a constant-current switch-mode power converter includes: receiving an input voltage: generating a modulation signal based at least in part on the input voltage: receiving the modulation signal: generating a drive signal based at least in part on the modulation signal; and outputting the drive signal to a transistor coupled to an inductive coil and a resistor: wherein: the drive signal corresponds to at least one switching cycle: the switching cycle includes an on-time during which the drive signal is at a first logic level and an off-time during which the drive signal is at a second logic level; and the off-time includes a demagnetization period during which the inductive coil undergoes a demagnetization process: wherein: the generating a modulation signal based at least in part on the input voltage includes generating a reference voltage based at least in part on the input voltage; and the reference voltage is equal to the input voltage multiplied by a ratio of the on-time to a sum of the on-time and the demagnetization period.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to circuits. More particularly, some embodiments of the invention provide constant-current switch-mode power converters and methods thereof. Merely by way of example, some embodiments of the invention have been applied to LED lighting. But it would be recognized that the invention has a much broader range of applicability.

Figure 1:
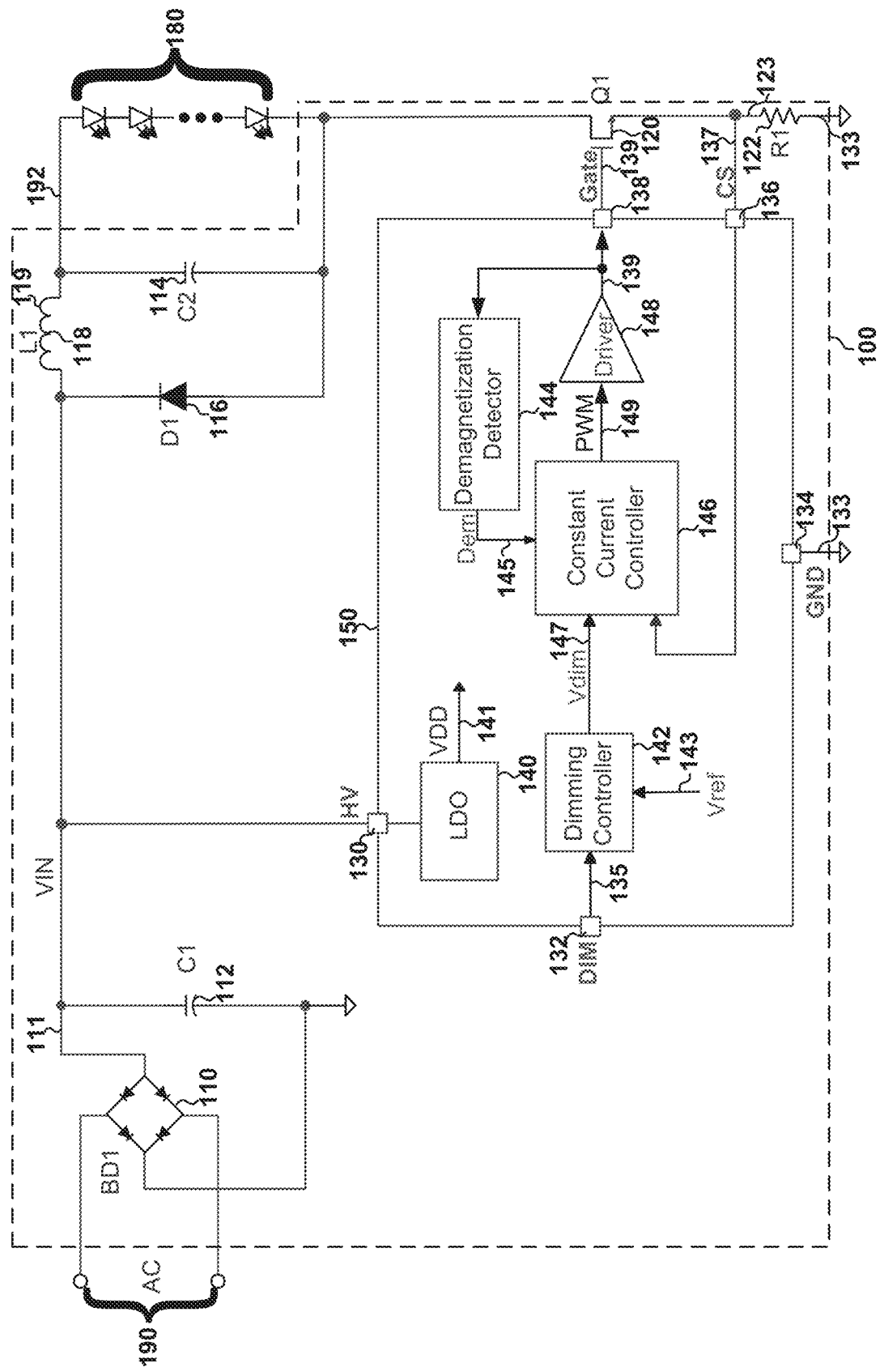
FIG. 1 is a simplified diagram showing a conventional constant-current switch-mode power converter for LED lighting with dimming control.

As shown in FIG. 1, the constant-current switch-mode power converter 100 uses a buck architecture according to certain embodiments. In some examples, the sensing voltage 137 is generated by the current 123 that flows through the resistor 122. For example, the sensing voltage 137 represents the current 119 that flows through the inductive coil 118 only when the transistor 120 is turned on. As an example, when the transistor 120 is turned off, the sensing voltage 137 does not represent the current 119 that flows through the inductive coil 118.

Figure 2:
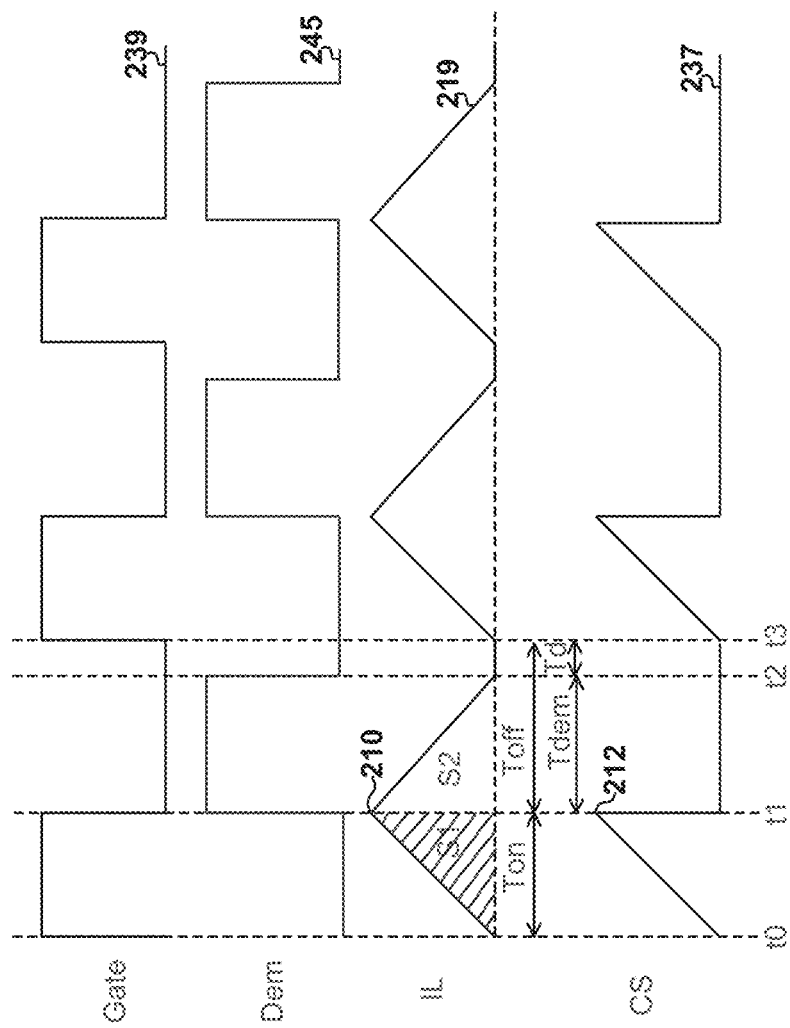
FIG. 2 shows simplified timing diagrams for the conventional constant-current switch-mode power converter as shown in FIG. 1 according to some embodiments.

FIG. 2 shows simplified timing diagrams for the conventional constant-current switch-mode power converter 100 as shown in FIG. 1 according to some embodiments. The waveform 239 represents the drive signal 139 as a function of time, the waveform 245 represents the demagnetization signal 145 as a function of time, the waveform 219 represents the current 119 as a function of time, and the waveform 237 represents the sensing voltage 137 as a function of time. For example, when the transistor 120 is turned off, the sensing voltage 137 is equal to zero as shown by the waveform 237. As an example, when the demagnetization signal 145 changes from a logic high level to a logic low level, the demagnetization process of the inductive coil 118 ends.

At time $t_0$, the drive signal 139 changes from a logic low level to a logic high level, and the transistor 120 changes from being turned off to being turned on as shown by the waveform 239 according to certain embodiments. For example, at time $t_0$, the demagnetization signal 145 is at the logic low level, and the inductive coil 118 does not undergo any demagnetization process as shown by the waveform 245. As an example, at time $t_0$, the current 119 that flows through the inductive coil 118 is equal to zero as shown by the waveform 219. For example, at time $t_0$, the sensing voltage 137 generated by the resistor 122 is equal to zero as shown by the waveform 237.

From time to $t_0$ time $t_1$, the drive signal 139 remains at the logic high level, and the transistor 120 remains being turned on as shown by the waveform 239 according to some embodiments. For example, from time to $t_0$ time $t_1$, the demagnetization signal 145 remains at the logic low level, and the inductive coil 118 does not undergo any demagnetization process as shown by the waveform 245. As an example, from time to $t_0$ time $t_1$, the current 119 that flows through the inductive coil 118 increases from zero to a peak current value 210 as shown by the waveform 219. For example, from time to $t_0$ time $t_1$, the sensing voltage 137 generated by the resistor 122 increases from zero to a peak voltage value 212 as shown by the waveform 237.

At time $t_1$, the drive signal 139 changes from the logic high level to the logic low level, and the transistor 120 changes from being turned on to being turned off as shown by the waveform 239 according to certain embodiments. For example, at time $t_1$, the demagnetization signal 145 changes from the logic low level to the logic high level, and the inductive coil 118 starts undergoing a demagnetization process as shown by the waveform 245. As an example, at time $t_1$, the current 119 that flows through the inductive coil 118 starts decreasing from the peak current value 210 as shown by the waveform 219. For example, at time $t_1$, the sensing voltage 137 generated by the resistor 122 drops from the peak voltage value 212 to zero as shown by the waveform 237.

From time $t_1$ to time $t_2$, the drive signal 139 remains at the logic low level, and the transistor 120 remains being turned off as shown by the waveform 239 according to some embodiments. For example, from time $t_1$ to time $t_2$, the demagnetization signal 145 remains at the logic high level, and the inductive coil 118 undergoes the demagnetization process as shown by the waveform 245. As an example, from time $t_1$ to time $t_2$, the current 119 that flows through the inductive coil 118 decreases from the peak current value 210 to zero as shown by the waveform 219. For example, from time $t_1$ to time $t_2$, the sensing voltage 137 generated by the resistor 122 remains equal to zero as shown by the waveform 237.

At time $t_2$, the drive signal 139 is at the logic low level, and the transistor 120 is turned off as shown by the waveform 239 according to certain embodiments. For example, at time $t_2$, the demagnetization signal 145 changes from the logic high level to the logic low level, and the demagnetization process for the inductive coil 118 ends as shown by the waveform 245. As an example, at time $t_2$, the current 119 that flows through the inductive coil 118 is equal to zero as shown by the waveform 219. For example, at time $t_2$, the sensing voltage 137 generated by the resistor 122 is equal to zero as shown by the waveform 237.

From time $t_2$ to time $t_3$, the drive signal 139 remains at the logic low level, and the transistor 120 remains being turned off as shown by the waveform 239 according to some embodiments. For example, from time $t_2$ to time $t_3$, the demagnetization signal 145 remains at the logic low level, and the inductive coil 118 does not undergo any demagnetization process as shown by the waveform 245. As an example, from time $t_2$ to time $t_3$, the current 119 that flows through the inductive coil 118 remains equal to zero as shown by the waveform 219. For example, from time $t_2$ to time $t_3$, the sensing voltage 137 generated by the resistor 122 remains equal to zero as shown by the waveform 237.

At time $t_3$, the drive signal 139 remains at the logic low level, and the transistor 120 remains being turned off as shown by the waveform 239 according to certain embodiments. For example, from time $t_2$ to time $t_3$, the demagnetization signal 145 remains at the logic low level, and the inductive coil 118 does not undergo any demagnetization process as shown by the waveform 245. As an example, from time $t_2$ to time $t_3$, the current 119 that flows through the inductive coil 118 remains equal to zero as shown by the waveform 219. For example, from time $t_2$ to time $t_3$, the sensing voltage 137 generated by the resistor 122 remains equal to zero as shown by the waveform 237.

At time $t_3$, the drive signal 139 changes from the logic low level to the logic high level, and the transistor 120 changes from being turned off to being turned on as shown by the waveform 239 according to some embodiments. For example, at time $t_3$, the demagnetization signal 145 is at the logic low level, and the inductive coil 118 does not undergo any demagnetization process as shown by the waveform 245. As an example, at time $t_3$, the current 119 that flows through the inductive coil 118 is equal to zero as shown by the waveform 219. For example, at time $t_3$, the sensing voltage 137 generated by the resistor 122 is equal to zero as shown by the waveform 237.

As shown in FIG. 2, for the constant-current switch-mode power converter 100, one switching cycle starts at time $t_0$ and ends at time $t_3$ according to certain embodiments. For example, the time duration (e.g., T) for one switching cycle of the constant-current switch-mode power converter 100 is equal to time $t_3$ minus time $t_0$. In some examples, the switching cycle includes an on-time (e.g., $T_{on}$) and an off-time (e.g., $T_{off}$). For example, the on-time (e.g., $T_{on}$) starts at time $t_0$ and ends at time $t^1$. As an example, during the on-time (e.g., $T_{on}$), the drive signal 139 remains at the logic high level, and the transistor 120 remains being turned on. For example, the off-time (e.g., $T_{off}$) starts at time $t_1$ and ends at time $t_3$. As an example, during the off-time (e.g., $T_{off}$), the drive signal 139 remains at the logic low level, and the transistor 120 remains being turned off. In certain examples, the off-time (e.g., $T_{off}$) is longer than a demagnetization period (e.g., $T_{dem}$). For example, the demagnetization period (e.g., $T_{dem}$) starts at time $t_1$ and ends at time $t_2$. As an example, during the demagnetization period (e.g., $T_{dem}$), the inductive coil 118 undergoes a demagnetization process. In some examples, during a delay time (e.g., $T_d$) from time $t_2$ to time $t_3$, the inductive coil 118 does not undergo any demagnetization process when the drive signal 139 remains at the logic low level and the transistor 120 remains being turned off.

In some embodiments, the constant-current switch-mode power converter 100 implements constant current control based at least in part on the peak voltage value 212 and the demagnetization period. For example, the converter controller 150 uses sampling to determine the peak voltage value 212, but the sampling and other signal processing contains certain errors. As an example, to achieve low brightness of the one or more LEDs 180, the peak voltage value 212 is small, so the error in constant current control can become large.

In certain embodiments, the output current 192 of the constant-current switch-mode power converter 100 is the average of the current 119 that flows through the inductive coil 118 during the time duration (e.g., T) for one switching cycle of the constant-current switch-mode power converter 100. For example, the integral of the current 119 with respect to time during the on-time (e.g., $T_{on}$) is equal to $S_1$, and the integral of the current 119 with respect to time during the demagnetization period (e.g., $T_{dem}$) is equal to $S_2$. As an example, the output current 192 of the constant-current switch-mode power converter 100 is determined as follows:

$$I_{out} = \frac{S_1 + S_2}{T_{on} + T_{off}} \quad \text{(Equation 1)}$$

where $I_{out}$ represents the output current 192. Additionally, $S_1$ represents the integral of the current 119 with respect to time during the on-time of one switching cycle of the constant-current switch-mode power converter 100, and $S_2$ represents the integral of the current 119 with respect to time during the demagnetization period of the switching cycle of the constant-current switch-mode power converter 100. Moreover, $T_{on}$ represents an on-time of the switching cycle, and $T_{off}$ represents an off-time of the switching cycle.

As shown in FIG. 2, the constant-current switch-mode power converter 100 operates in the discontinuous conduction mode (DCM) and/or the quasi-resonant (QR) mode according to some embodiments. For example, at the beginning (e.g., time $t_0$) of each switching cycle of the constant-current switch-mode power converter 100, the current 119 (e.g., IL) that flows through the inductive coil 118 starts increasing from zero. As an example, the relationship between the integral of the current 119 with respect to time during the on-time of a switching cycle and the integral of the current 119 with respect to time during the off-time of the switching cycle is determined as follows:

$$S_2 = S_1 \times \frac{T_{dem}}{T_{on}} \quad \text{(Equation 2)}$$

where $S_1$ represents the integral of the current 119 with respect to time during the on-time of one switching cycle of the constant-current switch-mode power converter 100, and $S_2$ represents the integral of the current 119 with respect to time during the demagnetization period of the switching cycle of the constant-current switch-mode power converter 100. Moreover, $T_{on}$ represents an on-time of the switching cycle, and $T_{dem}$ represents the demagnetization period of the switching cycle.

According to certain embodiments, using Equations 1 and 2, the output current 192 of the constant-current switch-mode power converter 100 is determined as follows:

$$I_{out} = \frac{S_1 \times \frac{T_{on} + T_{dem}}{T_{on}}}{T_{on} + T_{off}} \quad \text{(Equation 3)}$$

where $I_{out}$ represents the output current 192. Additionally, $S_1$ represents the integral of the current 119 with respect to time during the on-time of one switching cycle of the constant-current switch-mode power converter 100. Moreover, $T_{on}$ represents an on-time of the switching cycle, $T_{off}$ represents an off-time of the switching cycle, and $T_{dem}$ represents the demagnetization period of the switching cycle.

According to some embodiments, the average of the current 123 that flows through the resistor 122 during the time duration (e.g., T) for one switching cycle of the constant-current switch-mode power converter 100 is determined as follows:

$$I_{CS\_avg} = \frac{S_1}{T_{on} + T_{off}} \quad \text{(Equation 4)}$$

where $I_{CS\_avg}$ represents the average of the current 123 that flows through the resistor 122 during the time duration for one switching cycle of the constant-current switch-mode power converter 100. Additionally, $S_1$ represents the integral of the current 119 with respect to time during the on-time of the switching cycle. Moreover, $T_{on}$ represents an on-time of the switching cycle, and $T_{off}$ represents an off-time of the switching cycle.

In some embodiments, using Equations 3 and 4, the relationship between the average of the current 123 that flows through the resistor 122 during the time duration for one switching cycle and the output current 192 of the constant-current switch-mode power converter 100 is determined as follows:

$$\frac{I_{CS\_avg}}{I_{out}} = \frac{T_{on}}{T_{on} + T_{dem}} \quad \text{(Equation 5)}$$

where $I_{CS\_avg}$ represents the average of the current 123 that flows through the resistor 122 during the time duration for one switching cycle of the constant-current switch-mode power converter 100, and $I_{out}$ represents the output current 192. Additionally, $T_{on}$ represents an on-time of the switching cycle, and $T_{dem}$ represents the demagnetization period of the switching cycle.

Figure 3:
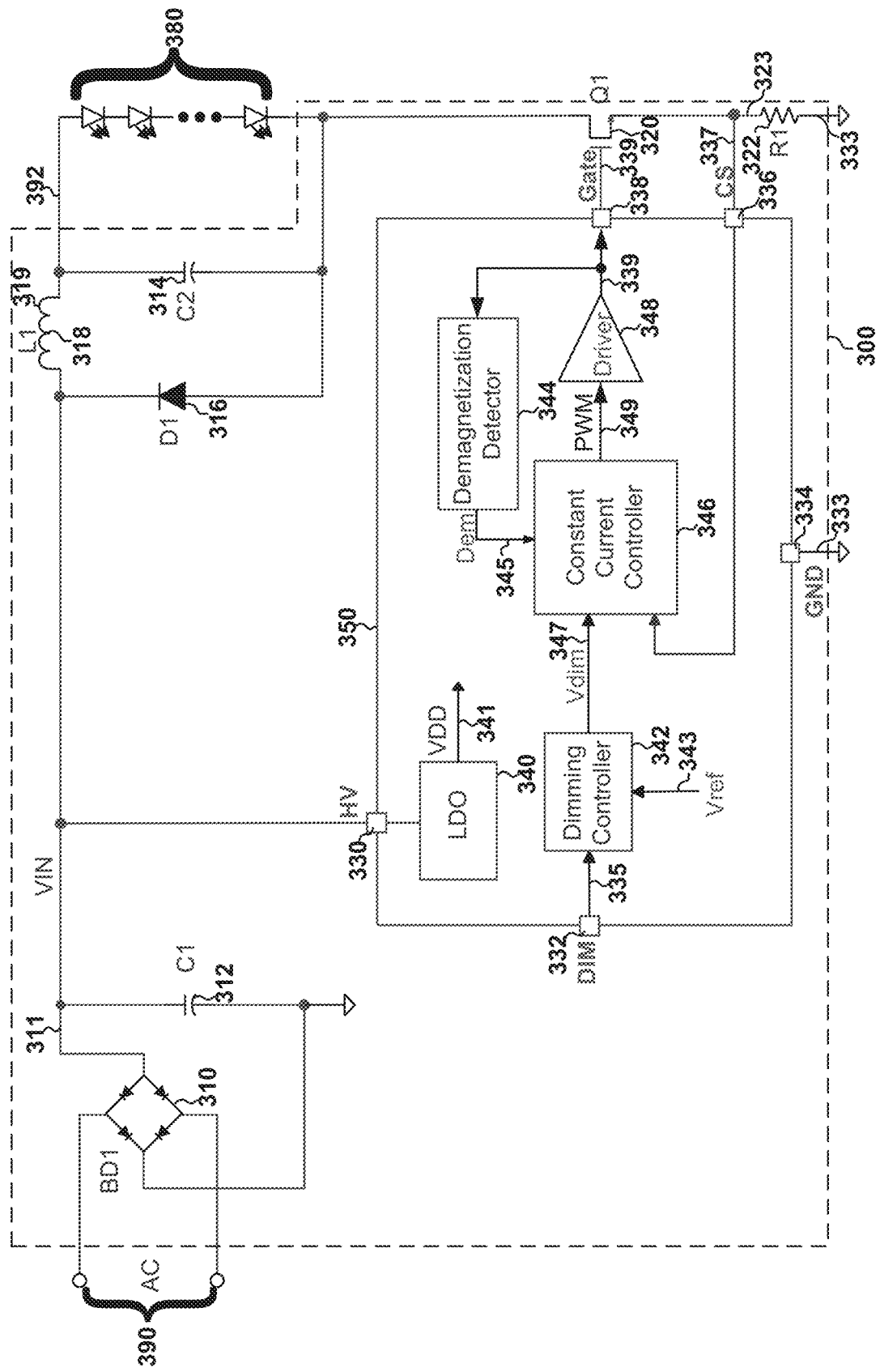
FIG. 3 is a simplified diagram showing a constant-current switch-mode power converter for LED lighting with dimming control according to certain embodiments of the present invention.
Figure 4:
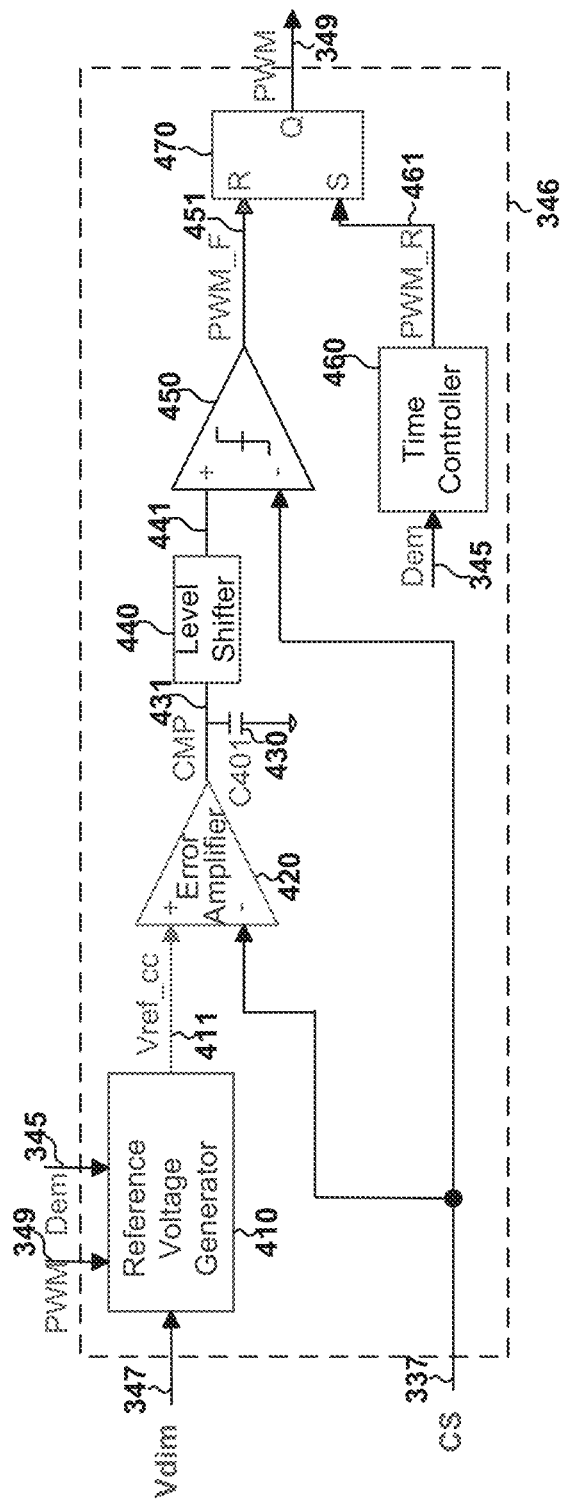
FIG. 4 is a simplified diagram showing the constant current controller of the converter controller as part of the constant-current switch-mode power converter as shown in FIG. 3 according to some embodiments of the present invention.

FIG. 3 is a simplified diagram showing a constant-current switch-mode power converter for LED lighting with dimming control according to certain embodiments of the present invention. This diagram is merely an example, which should not unduly limit the scope of the claims. One of ordinary skill in the art would recognize many variations, alternatives, and modifications. The constant-current switch-mode power converter 300 includes a bridge rectifier 310, capacitors 312 and 314, a diode 316, an inductive coil 318, a transistor 320, a resistor 322, and a converter controller 350. For example, the converter controller 350 includes components as shown in FIG. 4. In some examples, the constant-current switch-mode power converter 300 is a buck power converter. In certain examples, the transistor 320 is a power transistor. For example, the converter controller 350 (e.g., a chip) includes terminals 330, 332, 334, 336 and 338 (e.g., pins). As an example, the converter controller 350 also includes a low-dropout regulator (LDO) 340, a dimming controller 342, a demagnetization detector 344, a constant current controller 346, and a driver 348, wherein the constant current controller 346 is implemented according to at least FIG. 4. Although the above has been shown using a selected group of components for the constant-current switch-mode power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 3, the constant-current switch-mode power converter 300 receives an AC voltage 390 and generates an output current 392 based at least in part on a dimming control signal 335 according to some embodiments. For example, the output current 392 is received by one or more LEDs 380 and is used to control brightness of the one or more LEDs 380 according to the dimming control signal 335. As an example, the brightness of the one or more LEDs 380 are adjusted by changing the dimming control signal 335. In certain examples, the bridge rectifier 310 of the constant-current switch-mode power converter 300 receives the AC voltage 390 and generates a voltage 311 (e.g., VIN) based at least in part on the AC voltage 390.

In certain embodiments, the converter controller 350 receives the voltage 311 (e.g., VIN) at the terminal 330, receives the dimming control signal 335 at the terminal 332, receives a ground voltage 333 at the terminal 334, receives a sensing voltage 337 at the terminal 336, and generates a drive signal 339 at the terminal 338. In some examples, the drive signal 339 (e.g., a drive voltage) is received by the transistor 320 and is used to turn on and/or turn off the transistor 320. In certain examples, the transistor 320 is coupled to the inductive coil 318 through at least the diode 316 and/or the capacitor 314, and the transistor 320 is also coupled to the resistor 322. For example, the sensing voltage 337 is generated by a current 323 that flows through the resistor 322. As an example, the sensing voltage 337 represents a current 319 that flows through the inductive coil 318 if the transistor 320 is turned on. In some examples, the low-dropout regulator (LDO) 340 receives the voltage 311 (e.g., VIN) through the terminal 330 and generates a voltage 341 (e.g., VDD) based at least in part on the voltage 311. For example, the voltage 341 (e.g., VDD) is used to supply power to one or more internal circuits of the converter controller 350).

In some embodiments, the dimming controller 342 receives the dimming control signal 335 through the terminal 332 and a reference voltage 343 and generates a regulation voltage 347 (e.g., $V_{dim}$) based at least in part on the dimming control signal 335 and the reference voltage 343. For example, the demagnetization detector 344 receives the drive signal 339 and generates a demagnetization signal 345 (e.g., Dem) based at least in part on the drive signal 339. In certain examples, the demagnetization signal 345 (e.g., Dem) indicates the end of a demagnetization process of the inductive coil 318.

According to certain embodiments, the constant current controller 346 receives the sensing voltage 337, the demagnetization signal 345 (e.g., Dem) and the regulation voltage 347 (e.g., $V_{dim}$), and generates a signal 349 (e.g., a pulse width modulation signal) based at least in part upon the sensing voltage 337, the demagnetization signal 345 (e.g., Dem) and the regulation voltage 347 (e.g., $V_{dim}$). For example, the regulation voltage 347 (e.g., $V_{dim}$) is used as an input voltage for the constant current controller 346. In some examples, the signal 349 (e.g., a pulse width modulation signal) is received by the driver 348, which generates the drive signal 339 based at least in part upon the signal 349. For example, if the signal 349 is at a logic high level, the drive signal 339 is also at the logic high level, and if the signal 349 is at a logic low level, the drive signal 339 is also at the logic low level.

According to some embodiments, the drive signal 339 is a drive voltage, which is received by a gate terminal of the transistor 320. For example, the dimming control signal 335 is a DC signal (e.g., a DC voltage). As an example, the dimming control signal 335 is a pulse width modulation signal (e.g., a pulse width modulation voltage). In certain examples, the demagnetization signal 345 (e.g., Dem) is used for constant current control and operation mode control of the constant-current switch-mode power converter 300. For example, the constant-current switch-mode power converter 300 operates in the discontinuous conduction mode (DCM). As an example, the constant-current switch-mode power converter 300 operates in the quasi-resonant (QR) mode. In some examples, the sensing voltage 337 is used to implement the closed-loop constant current control of the constant-current switch-mode power converter 300.

Figure 6:
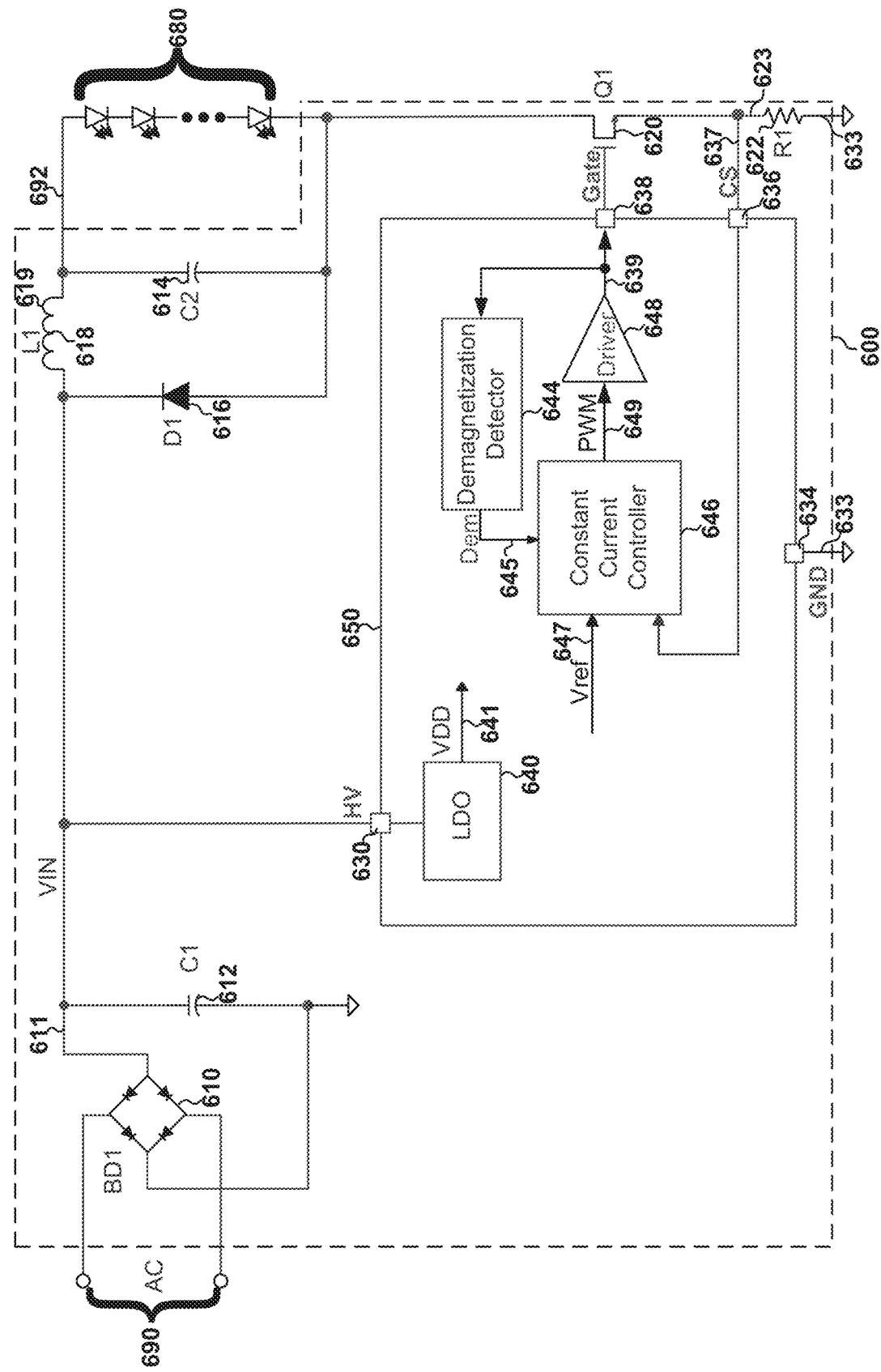
FIG. 6 is a simplified diagram showing a constant-current switch-mode power converter for LED lighting with predetermined brightness according to certain embodiments of the present invention.

As discussed above and further emphasized here. FIG. 3 is merely an example, which should not unduly limit the scope of the claims. One of ordinary skill in the art would recognize many variations, alternatives, and modifications. In certain embodiments, the demagnetization detector 644 receives an external signal from a source that is external to the converter controller 350) (e.g., a chip) and generates the demagnetization signal 345 (e.g., Dem) based at least in part on the external signal. In some embodiments, the constant-current switch-mode power converter 300 is modified to output the output current 392 that provides a predetermined brightness for the one or more LEDs 380. For example, the dimming controller 342 is removed and the terminal 332 is also removed from the constant-current switch-mode power converter 300, and the regulation voltage 347 is replaced by a predetermined reference voltage that corresponds to the predetermined brightness for the one or more LEDs 380. As an example, the modified constant-current switch-mode power converter is shown in FIG. 6.

FIG. 4 is a simplified diagram showing the constant current controller 346 of the converter controller 350 as part of the constant-current switch-mode power converter 300 as shown in FIG. 3 according to some embodiments of the present invention. This diagram is merely an example, which should not unduly limit the scope of the claims. One of ordinary skill in the art would recognize many variations, alternatives, and modifications. The constant current controller 346 includes a reference voltage generator 410, an error amplifier 420, a capacitor 430, a level shifter 440, a comparator 450, a time controller 460, and a flip flop 470. Although the above has been shown using a selected group of components for the constant current controller, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

According to certain embodiments, the reference voltage generator 410) receives the regulation voltage 347, the signal 349 (e.g., a pulse width modulation signal) and the demagnetization signal 345, and generates a reference voltage 411 based at least in part on the regulation voltage 347, the signal 349 (e.g., a pulse width modulation signal) and the demagnetization signal 345. In some examples, the reference voltage 411 is determined as follows:

$$V_{ref\_cc} = V_{dim} \times \frac{T_{on}}{T_{on} + T_{dem}} \qquad \text{(Equation 6)}$$

where $V_{ref\_cc}$ represents the reference voltage 411, and $V_{dim}$ represents the regulation voltage 347. Additionally, $T_{on}$ represents an on-time of a switching cycle of the constant-current switch-mode power converter 300, and $T_{dem}$ represents the demagnetization period of the switching cycle of the constant-current switch-mode power converter 300.

According to some embodiments, the error amplifier 420 receives the reference voltage 411 and the sensing voltage 337, and generates, together with the capacitor 430, a compensation voltage 431 based at least in part on the reference voltage 411 and the sensing voltage 337. For example, the compensation voltage 431 represents an integral of a difference between the reference voltage 411 and the sensing voltage 337 with respect to time during one switching cycle of the constant-current switch-mode power converter 300. As an example, the switching cycle of the constant-current switch-mode power converter 300 is equal to a sum of an on-time (e.g., $T_{on}$) and an off-time (e.g., $T_{off}$).

In certain embodiments, the compensation voltage 431 is received by the level shifter 440, which generates a level-shifted voltage 441. In some example, the comparator 450 receives the level-shifted voltage 441 and the sensing voltage 337 and generates a comparison signal 451. For example, the comparison signal 451 is used as a turn-off control signal. In some embodiments, the time controller 460 receives the demagnetization signal 345 and generates a turn-on control signal 461.

According to certain embodiments, the flip flop 470 receives the turn-off control signal 451 and the turn-on control signal 461 and generates the signal 349 (e.g., a pulse width modulation signal) based at least in part on the turn-off control signal 451 and the turn-on control signal 461. For example, the turn-off control signal 451 is used to change the signal 349 from a logic high level to a logic low level. As an example, the turn-on control signal 461 is used to change the signal 349 from the logic low level to the logic high level.

According to FIG. 3 and FIG. 4, based at least in part on Equation 6, the output current 392 of the constant-current switch-mode power converter 300 is determined as follows:

$$I_{out} = \frac{V_{dim}}{2 \times R_{CS}} \qquad \text{(Equation 7)}$$

where $I_{out}$ represents the output current 392. Additionally, $V_{dim}$ represents the regulation voltage 347, and Rcs represents the resistance of the resistor 322.

Figure 5:
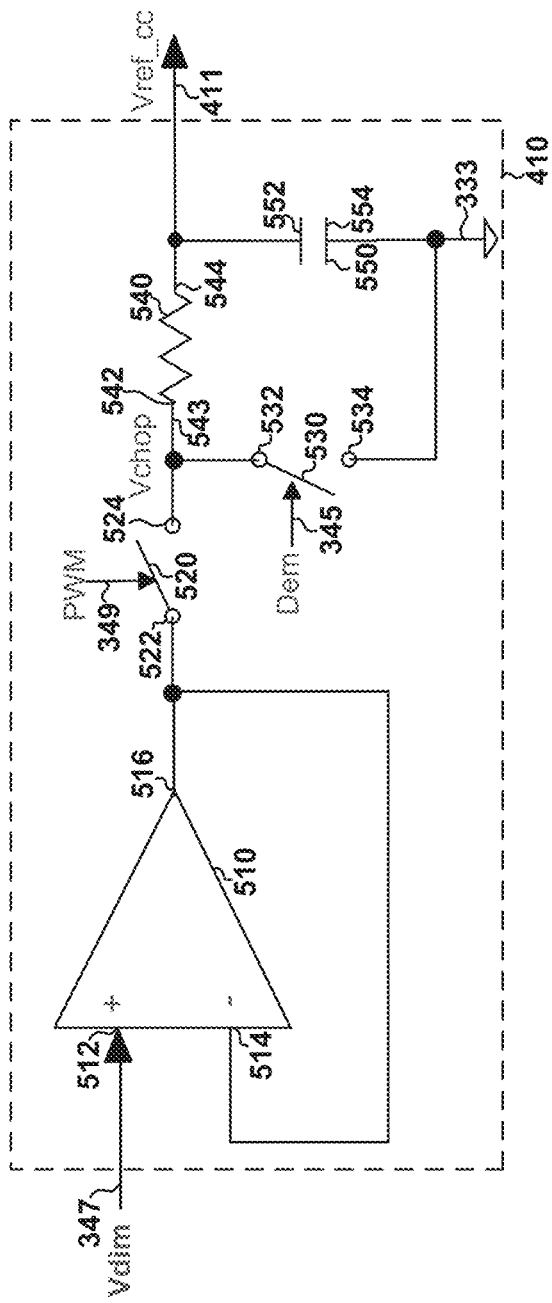
FIG. 5 is a simplified diagram showing the reference voltage generator of the constant current controller as part of the converter controller of the constant-current switch-mode power converter as shown in FIG. 3 and FIG. 4 according to certain embodiments of the present invention.

FIG. 5 is a simplified diagram showing the reference voltage generator 410 of the constant current controller 346 as part of the converter controller 350 of the constant-current switch-mode power converter 300 as shown in FIG. 3 and FIG. 4 according to certain embodiments of the present invention. This diagram is merely an example, which should not unduly limit the scope of the claims. One of ordinary skill in the art would recognize many variations, alternatives, and modifications. The reference voltage generator 410 includes an amplifier 510, switches 520 and 530, a resistor 540, and a capacitor 550. Although the above has been shown using a selected group of components for the reference voltage generator, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the amplifier 510 includes a non-inverting input terminal 512, an inverting input terminal 514, and an output terminal 516. In certain examples, the amplifier 510 is used as a buffer. For example, the non-inverting input terminal 512 (e.g., the "+" terminal) receives the regulation voltage 347 (e.g., $V_{dim}$), and the inverting input terminal 514 (e.g., the "−" terminal) is connected to the output terminal 516. In some examples, the output terminal 516 is connected to a terminal 522 of the switch 520, which also includes a terminal 524. For example, if the signal 349 (e.g., a pulse width modulation signal) is at a logic high level, the switch 520 is closed. As an example, if the signal 349 (e.g., a pulse width modulation signal) is at a logic low level, the switch 520 is open.

In certain embodiments, the terminal 524 of the switch 520 is connected to a terminal 542 of the resistor 540 and a terminal 532 of the switch 530. For example, the resistor 540 also includes a terminal 544. As an example, the switch 530 also includes a terminal 534. In some examples, the terminal 534 of the switch 530 is biased to a ground voltage. For example, if the demagnetization signal 345 (e.g., Dem) is at a logic high level, the switch 530 is closed. As an example, if the demagnetization signal 345 (e.g., Dem) is at a logic low level, the switch 530 is open. In certain examples, the terminal 532 of the switch 530 is connected to a terminal 552 of the capacitor 550, which also includes a terminal 554. For example, the terminal 554 of the capacitor 550 is biased to the ground voltage. As an example, the terminal 552 of the capacitor 550 provides the reference voltage 411.

According to some embodiments, the regulation voltage 347 (e.g., $V_{dim}$) is coupled to the terminal 522 of the switch 520 through the buffer 510. In certain examples, the regulation voltage 347 (e.g., $V_{dim}$) undergoes a chopping process. For example, the chopping process includes controlling turning on and/or turning off of the switch 520 by the signal 349 (e.g., the pulse width modulation signal) and controlling turning on and/or turning off of the switch 530 by the demagnetization signal 345 (e.g., Dem).

According to certain embodiments, the resistor 540 and the capacitor 550 are parts of a low-pass filter. For example, the terminal 542 of the resistor 540 receives a voltage 543 from the terminal 524 of the switch 520 and the terminal 532 of the switch 530. As an example, the low-pass filter receives the voltage 543 (e.g., $V_{chop}$) and generates the reference voltage 411. In some examples, the reference voltage 411 is a DC voltage. In certain examples, the relationship between the reference voltage 411 (e.g., $V_{ref\_cc}$) and the regulation voltage 347 (e.g., the $V_{dim}$) satisfies Equation 6.

FIG. 6 is a simplified diagram showing a constant-current switch-mode power converter for LED lighting with predetermined brightness according to certain embodiments of the present invention. This diagram is merely an example, which should not unduly limit the scope of the claims. One of ordinary skill in the art would recognize many variations, alternatives, and modifications. The constant-current switch-mode power converter 600 includes a bridge rectifier 610, capacitors 612 and 614, a diode 616, an inductive coil 618, a transistor 620, a resistor 622, and a converter controller 650. For example, the converter controller 650 includes components as shown in FIG. 4 by replacing the regulation voltage 347 with a predetermined reference voltage 647. In some examples, the constant-current switch-mode power converter 600 is a buck power converter. In certain examples, the transistor 620 is a power transistor. For example, the converter controller 650 (e.g., a chip) includes terminals 630, 634, 636 and 638 (e.g., pins). As an example, the converter controller 650 also includes a low-dropout regulator (LDO) 640, a demagnetization detector 644, a constant current controller 646, and a driver 648, wherein the constant current controller 646 is implemented according to at least FIG. 4 by replacing the regulation voltage 347 with the predetermined reference voltage 647. Although the above has been shown using a selected group of components for the constant-current switch-mode power converter, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

As shown in FIG. 6, the constant-current switch-mode power converter 600 receives an AC voltage 690 and generates an output current 692 according to some embodiments. For example, the output current 692 is received by one or more LEDs 680 and is used to provide a predetermined brightness for the one or more LEDs 680. In certain examples, the bridge rectifier 610 of the constant-current switch-mode power converter 600 receives the AC voltage 690 and generates a voltage 611 (e.g., VIN) based at least in part on the AC voltage 690.

In certain embodiments, the converter controller 650 receives the voltage 611 (e.g., VIN) at the terminal 630, receives a ground voltage 633 at the terminal 634, receives a sensing voltage 637 at the terminal 636, and generates a drive signal 639 at the terminal 638. In some examples, the drive signal 639 (e.g., a drive voltage) is received by the transistor 620 and is used to turn on and/or turn off the transistor 620. In certain examples, the transistor 620 is coupled to the inductive coil 618 through at least the diode 616 and/or the capacitor 614, and the transistor 620 is also coupled to the resistor 622. For example, the sensing voltage 637 is generated by a current 623 that flows through the resistor 622. As an example, the sensing voltage 637 represents a current 619 that flows through the inductive coil 618 if the transistor 620 is turned on. In some examples, the low-dropout regulator (LDO) 640 receives the voltage 611 (e.g., VIN) through the terminal 630 and generates a voltage 641 (e.g., VDD) based at least in part on the voltage 611. For example, the voltage 641 (e.g., VDD) is used to supply power to one or more internal circuits of the converter controller 650. In some embodiments, the demagnetization detector 644 receives the drive signal 639 and generates a demagnetization signal 645 (e.g., Dem) based at least in part on the drive signal 639. For example, the demagnetization signal 645 (e.g., Dem) indicates the end of a demagnetization process of the inductive coil 618.

According to certain embodiments, the constant current controller 646 receives the sensing voltage 637, the demagnetization signal 645 (e.g., Dem) and the predetermined reference voltage 647, and generates a signal 649 (e.g., a pulse width modulation signal) based at least in part upon the sensing voltage 637, the demagnetization signal 645 (e.g., Dem) and the predetermined reference voltage 647. For example, the predetermined reference voltage 647 is used as an input voltage for the constant current controller 646. In some examples, the signal 649 (e.g., a pulse width modulation signal) is received by the driver 648, which generates the drive signal 639 based at least in part upon the signal 649. For example, if the signal 649 is at a logic high level, the drive signal 639 is also at the logic high level, and if the signal 649 is at a logic low level, the drive signal 639 is also at the logic low level.

According to some embodiments, the drive signal 639 is a drive voltage, which is received by a gate terminal of the transistor 620. For example, the predetermined reference voltage 647 corresponds to a predetermined brightness for the one or more LEDs 680. In certain examples, the demagnetization signal 645 (e.g., Dem) is used for constant current control and operation mode control of the constant-current switch-mode power converter 600. For example, the constant-current switch-mode power converter 600 operates in the discontinuous conduction mode (DCM). As an example, the constant-current switch-mode power converter 600 operates in the quasi-resonant (QR) mode. In some examples, the sensing voltage 637 is used to implement the closed-loop constant current control of the constant-current switch-mode power converter 600.

As discussed above and further emphasized here. FIG. 6 is merely an example, which should not unduly limit the scope of the claims. One of ordinary skill in the art would recognize many variations, alternatives, and modifications. For example, the demagnetization detector 644 receives an external signal from a source that is external to the converter controller 650 (e.g., a chip) and generates the demagnetization signal 645 (e.g., Dem) based at least in part on the external signal.

Some embodiments of the present invention provide a constant-current switch-mode power converter that does not need to use sampling to determine a peak voltage value of a sensing voltage. For example, the constant-current switch-mode power converter avoids certain errors related to the voltage sampling. As an example, the constant-current switch-mode power converter improves accuracy of the constant current control.

According to certain embodiments, a controller for a constant-current switch-mode power converter includes: a constant-current controller configured to receive an input voltage and generate a modulation signal based at least in part on the input voltage; and a driver configured to receive the modulation signal, generate a drive signal based at least in part on the modulation signal, and output the drive signal to a transistor coupled to an inductive coil and a resistor: wherein: the drive signal corresponds to at least one switching cycle: the switching cycle includes an on-time during which the drive signal is at a first logic level and an off-time during which the drive signal is at a second logic level; and the off-time includes a demagnetization period during which the inductive coil undergoes a demagnetization process: wherein: the constant-current controller includes a reference voltage generator configured to receive the input voltage and generate a reference voltage based at least in part on the input voltage; and the reference voltage is equal to the input voltage multiplied by a ratio of the on-time to a sum of the on-time and the demagnetization period. For example, the controller is implemented according to at least FIG. 3, FIG. 4, and/or FIG. 6.

As an example, if the modulation signal is at the first logic level, the drive signal is at the first logic level; and if the modulation signal is at the second logic level, the drive signal is at the second logic level. For example, if the drive signal is at the first logic level, the transistor is turned on; and if the drive signal is at the second logic level, the transistor is turned off. As an example, the first logic level is a logic high level; and the second logic level is a logic low level. For example, the constant-current controller is further configured to: receive a demagnetization signal indicating an end of the demagnetization process; and generate the modulation signal based at least in part on the input voltage and the demagnetization signal. As an example, the constant-current controller is further configured to: receive a sensing voltage from the resistor, the sensing voltage indicating a current that flows through the inductive coil if the transistor is turned on; and generate the modulation signal based at least in part on the input voltage, the demagnetization signal, and the sensing voltage.

For example, the constant-current controller further includes: an error amplifier configured to receive the reference voltage and a sensing voltage from the resistor and generate, together with a capacitor, a compensation voltage based at least in part on the reference voltage and the sensing voltage: a level shifter configured to receive the compensation voltage and generate a level-shifted voltage based at least in part on the compensation voltage: a comparator configured to receive the level-shifted voltage and the sensing voltage and generate a comparison signal based at least in part on the level-shifted voltage and the sensing voltage: a time controller configured to receive a demagnetization signal indicating an end of the demagnetization process and generate a control signal based at least in part on the demagnetization signal; and a flip flop configured to receive the comparison signal and the control signal and generate the modulation signal based at least in part on the comparison signal and the control signal. As an example, the flip flop is further configured to: use the comparison signal to change the modulation signal from the first logic level to the second logic level; and use the control signal to change the modulation signal from the second logic level to the first logic level.

For example, the reference voltage generator includes: an amplifier including a first input terminal, a second input terminal, and an output terminal, the first input terminal being configured to receive the input voltage, the second input terminal being connected to the output terminal: a first switch including a first switch terminal and a second switch terminal, the first switch terminal being connected to the output terminal: a second switch including a third switch terminal and a fourth switch terminal, the third switch terminal being connected to the second switch terminal: a resistor including a first resistor terminal and a second resistor terminal, the first resistor terminal being connected to the second switch terminal and the third switch terminal; and a capacitor including a first capacitor terminal and a second capacitor terminal, the first capacitor terminal being connected to the second resistor terminal and configured to output the reference voltage. As an example, the first switch is configured to receive the modulation signal in order to open or close the first switch. For example, the second switch is configured to receive a demagnetization signal indicating an end of the demagnetization process in order to open or close the second switch. As an example, the controller further includes a dimming controller configured to receive a dimming signal and generate the input voltage based at least in part on the dimming signal.

According to some embodiments, a constant-current controller includes: a reference voltage generator configured to receive an input voltage and generate a reference voltage based at least in part on the input voltage: an error amplifier configured to receive the reference voltage and a sensing voltage from a resistor coupled to a transistor, the error amplifier being further configured to generate, together with a capacitor, a compensation voltage based at least in part on the reference voltage and the sensing voltage: a level shifter configured to receive the compensation voltage and generate a level-shifted voltage based at least in part on the compensation voltage: a comparator configured to receive the level-shifted voltage and the sensing voltage and generate the comparison signal based at least in part on the level-shifted voltage and the sensing voltage: a time controller configured to receive a demagnetization signal indicating an end of a demagnetization process of an inductive coil coupled to the transistor, the time controller being configured to generate a control signal based at least in part on the demagnetization signal; and a flip flop configured to receive the comparison signal and the control signal and generate a modulation signal based at least in part on the comparison signal and the control signal. For example, the constant-current controller is implemented according to at least FIG. 4. As an example, the flip flop is further configured to: use the comparison signal to change the modulation signal from the first logic level to the second logic level in order to turn off the transistor; and use the control signal to change the modulation signal from the second logic level to the first logic level in order to turn on the transistor.

According to certain embodiments, a method for a constant-current switch-mode power converter includes: receiving an input voltage: generating a modulation signal based at least in part on the input voltage: receiving the modulation signal: generating a drive signal based at least in part on the modulation signal; and outputting the drive signal to a transistor coupled to an inductive coil and a resistor: wherein: the drive signal corresponds to at least one switching cycle: the switching cycle includes an on-time during which the drive signal is at a first logic level and an off-time during which the drive signal is at a second logic level; and the off-time includes a demagnetization period during which the inductive coil undergoes a demagnetization process: wherein: the generating a modulation signal based at least in part on the input voltage includes generating a reference voltage based at least in part on the input voltage; and the reference voltage is equal to the input voltage multiplied by a ratio of the on-time to a sum of the on-time and the demagnetization period. For example, the method is implemented according to at least FIG. 3, FIG. 4, and/or FIG. 6.

As an example, wherein the generating a drive signal based at least in part on the modulation signal includes: if the modulation signal is at the first logic level, generating the drive signal at the first logic level; and if the modulation signal is at the second logic level, generating the drive signal at the second logic level. For example, the outputting the drive signal to a transistor includes: if the drive signal is at the first logic level, turning on the transistor; and if the drive signal is at the second logic level, turning off the transistor. As an example, the first logic level is a logic high level; and the second logic level is a logic low level. For example, the method further includes: receiving a demagnetization signal indicating an end of the demagnetization process: wherein the generating a modulation signal based at least in part on the input voltage includes generating the modulation signal based at least in part on the input voltage and the demagnetization signal. As an example, the method further includes: receiving a sensing voltage from the resistor, the sensing voltage indicating a current that flows through the inductive coil if the transistor is turned on; wherein the generating the modulation signal based at least in part on the input voltage and the demagnetization signal includes generating the modulation signal based at least in part on the input voltage, the demagnetization signal, and the sensing voltage.

For example, the generating a modulation signal based at least in part on the input voltage further includes: receiving the reference voltage and a sensing voltage from the resistor: generating a compensation voltage based at least in part on the reference voltage and the sensing voltage; receiving the compensation voltage: generating a level-shifted voltage based at least in part on the compensation voltage: receiving the level-shifted voltage and the sensing voltage: generating a comparison signal based at least in part on the level-shifted voltage and the sensing voltage: receiving a demagnetization signal indicating an end of the demagnetization process: generating a control signal based at least in part on the demagnetization signal: receiving the comparison signal and the control signal; and generating the modulation signal based at least in part on the comparison signal and the control signal. As an example, the generating the modulation signal based at least in part on the comparison signal and the control signal includes: using the comparison signal to change the modulation signal from the first logic level to the second logic level; and using the control signal to change the modulation signal from the second logic level to the first logic level. For example, the method further includes: receiving a dimming signal; and generating the input voltage based at least in part on the dimming signal.

For example, some or all components of various embodiments of the present invention each are, individually and/or in combination with at least another component, implemented using one or more software components, one or more hardware components, and/or one or more combinations of software and hardware components. As an example, some or all components of various embodiments of the present invention each are, individually and/or in combination with at least another component, implemented in one or more circuits, such as one or more analog circuits and/or one or more digital circuits. For example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A controller for a constant-current switch-mode power converter, the controller comprising:
   a constant-current controller configured to receive an input voltage and generate a modulation signal based at least in part on the input voltage; and
   a driver configured to receive the modulation signal, generate a drive signal based at least in part on the modulation signal, and output the drive signal to a transistor coupled to an inductive coil and a resistor;
   wherein:
   the drive signal corresponds to at least one switching cycle;
   the switching cycle includes an on-time during which the drive signal is at a first logic level and an off-time during which the drive signal is at a second logic level; and
   the off-time includes a demagnetization period during which the inductive coil undergoes a demagnetization process;
   wherein:
   the constant-current controller includes a reference voltage generator configured to receive the input voltage and generate a reference voltage based at least in part on the input voltage; and
   the reference voltage is equal to the input voltage multiplied by a ratio of the on-time to a sum of the on-time and the demagnetization period.

2. The controller of claim 1 wherein:
   if the modulation signal is at the first logic level, the drive signal is at the first logic level; and
   if the modulation signal is at the second logic level, the drive signal is at the second logic level.

3. The controller of claim 1 wherein:
   if the drive signal is at the first logic level, the transistor is turned on; and
   if the drive signal is at the second logic level, the transistor is turned off.

4. The controller of claim 3 wherein:
   the first logic level is a logic high level; and
   the second logic level is a logic low level.

5. The controller of claim 1 wherein the constant-current controller is further configured to:
   receive a demagnetization signal indicating an end of the demagnetization process; and
   generate the modulation signal based at least in part on the input voltage and the demagnetization signal.

6. The controller of claim 5 wherein the constant-current controller is further configured to:
   receive a sensing voltage from the resistor, the sensing voltage indicating a current that flows through the inductive coil if the transistor is turned on; and
   generate the modulation signal based at least in part on the input voltage, the demagnetization signal, and the sensing voltage.

7. The controller of claim 1 wherein the constant-current controller further includes:
   an error amplifier configured to receive the reference voltage and a sensing voltage from the resistor and generate, together with a capacitor, a compensation voltage based at least in part on the reference voltage and the sensing voltage;
   a level shifter configured to receive the compensation voltage and generate a level-shifted voltage based at least in part on the compensation voltage;
   a comparator configured to receive the level-shifted voltage and the sensing voltage and generate a comparison signal based at least in part on the level-shifted voltage and the sensing voltage;
   a time controller configured to receive a demagnetization signal indicating an end of the demagnetization process and generate a control signal based at least in part on the demagnetization signal; and
   a flip flop configured to receive the comparison signal and the control signal and generate the modulation signal based at least in part on the comparison signal and the control signal.

8. The controller of claim 7 wherein the flip flop is further configured to:
   use the comparison signal to change the modulation signal from the first logic level to the second logic level; and
   use the control signal to change the modulation signal from the second logic level to the first logic level.

9. The controller of claim 1 wherein the reference voltage generator includes:
   an amplifier including a first input terminal, a second input terminal, and an output terminal, the first input terminal being configured to receive the input voltage, the second input terminal being connected to the output terminal;

a first switch including a first switch terminal and a second switch terminal, the first switch terminal being connected to the output terminal;

a second switch including a third switch terminal and a fourth switch terminal, the third switch terminal being connected to the second switch terminal;

a resistor including a first resistor terminal and a second resistor terminal, the first resistor terminal being connected to the second switch terminal and the third switch terminal; and a capacitor including a first capacitor terminal and a second capacitor terminal, the first capacitor terminal being connected to the second resistor terminal and configured to output the reference voltage.

10. The controller of claim 9 wherein the first switch is configured to receive the modulation signal in order to open or close the first switch.

11. The controller of claim 9 wherein the second switch is configured to receive a demagnetization signal indicating an end of the demagnetization process in order to open or close the second switch.

12. The controller of claim 1, and further comprising a dimming controller configured to receive a dimming signal and generate the input voltage based at least in part on the dimming signal.

13. A constant-current controller, the controller comprising:
a reference voltage generator configured to receive an input voltage and generate a reference voltage based at least in part on the input voltage;
an error amplifier configured to receive the reference voltage and a sensing voltage from a resistor coupled to a transistor, the error amplifier being further configured to generate, together with a capacitor, a compensation voltage based at least in part on the reference voltage and the sensing voltage;
a level shifter configured to receive the compensation voltage and generate a level-shifted voltage based at least in part on the compensation voltage;
a comparator configured to receive the level-shifted voltage and the sensing voltage and generate the comparison signal based at least in part on the level-shifted voltage and the sensing voltage;
a time controller configured to receive a demagnetization signal indicating an end of a demagnetization process of an inductive coil coupled to the transistor, the time controller being configured to generate a control signal based at least in part on the demagnetization signal; and
a flip flop configured to receive the comparison signal and the control signal and generate a modulation signal based at least in part on the comparison signal and the control signal.

14. The constant-current controller of claim 13 wherein the flip flop is further configured to:
use the comparison signal to change the modulation signal from the first logic level to the second logic level in order to turn off the transistor; and
use the control signal to change the modulation signal from the second logic level to the first logic level in order to turn on the transistor.

15. A method for a constant-current switch-mode power converter, the method comprising:
receiving an input voltage;
generating a modulation signal based at least in part on the input voltage;
receiving the modulation signal;
generating a drive signal based at least in part on the modulation signal; and
outputting the drive signal to a transistor coupled to an inductive coil and a resistor;
wherein:
the drive signal corresponds to at least one switching cycle;
the switching cycle includes an on-time during which the drive signal is at a first logic level and an off-time during which the drive signal is at a second logic level; and
the off-time includes a demagnetization period during which the inductive coil undergoes a demagnetization process;
wherein:
the generating a modulation signal based at least in part on the input voltage includes generating a reference voltage based at least in part on the input voltage; and
the reference voltage is equal to the input voltage multiplied by a ratio of the on-time to a sum of the on-time and the demagnetization period.

16. The method of claim 15 wherein the generating a drive signal based at least in part on the modulation signal includes:
if the modulation signal is at the first logic level, generating the drive signal at the first logic level; and
if the modulation signal is at the second logic level, generating the drive signal at the second logic level.

17. The method of claim 15 wherein the outputting the drive signal to a transistor includes:
if the drive signal is at the first logic level, turning on the transistor; and
if the drive signal is at the second logic level, turning off the transistor.

18. The method of claim 17 wherein:
the first logic level is a logic high level; and
the second logic level is a logic low level.

19. The method of claim 15, and further comprising:
receiving a demagnetization signal indicating an end of the demagnetization process;
wherein the generating a modulation signal based at least in part on the input voltage includes generating the modulation signal based at least in part on the input voltage and the demagnetization signal.

20. The method of claim 19, and further comprising:
receiving a sensing voltage from the resistor, the sensing voltage indicating a current that flows through the inductive coil if the transistor is turned on;
wherein the generating the modulation signal based at least in part on the input voltage and the demagnetization signal includes generating the modulation signal based at least in part on the input voltage, the demagnetization signal, and the sensing voltage.

21. The method of claim 15 wherein the generating a modulation signal based at least in part on the input voltage further includes:
receiving the reference voltage and a sensing voltage from the resistor;
generating a compensation voltage based at least in part on the reference voltage and the sensing voltage;
receiving the compensation voltage;
generating a level-shifted voltage based at least in part on the compensation voltage;
receiving the level-shifted voltage and the sensing voltage;

generating a comparison signal based at least in part on the level-shifted voltage and the sensing voltage;

receiving a demagnetization signal indicating an end of the demagnetization process;

generating a control signal based at least in part on the demagnetization signal;

receiving the comparison signal and the control signal; and generating the modulation signal based at least in part on the comparison signal and the control signal.

22. The method of claim 21 wherein the generating the modulation signal based at least in part on the comparison signal and the control signal includes:

using the comparison signal to change the modulation signal from the first logic level to the second logic level; and using the control signal to change the modulation signal from the second logic level to the first logic level.

23. The method of claim 15, and further comprising:

receiving a dimming signal; and generating the input voltage based at least in part on the dimming signal.

\* \* \* \* \*